United States Patent Office 3,636,123
Patented Jan. 18, 1972

3,636,123
OXYDEHYDROGENATION PROCESS
Roger M. Bean, Glen Mills, Pa., assignor to Sun Oil Company, Philadelphia, Pa.
No Drawing. Continuation-in-part of application Ser. No. 15,893, Mar. 2, 1970. This application Jan. 28, 1971, Ser. No. 110,638
Int. Cl. C07c 5/18
U.S. Cl. 260—680 E    4 Claims

ABSTRACT OF THE DISCLOSURE

Oxydehydrogenation of 2,3-dimethylbutene-1 to 2,3-dimethylbutadiene using a catalyst obtained from ammonium hexamolybdochromiate.

RELATED APPLICATION

This application is a continuation-in-part of Ser. No. 15,893 filed Mar. 2, 1970 and now abandoned.

Catalysts derived from ammonium hexamolybdochromiate are known and have been used heretofore in conjunction with bismuth oxides for the preparation of unsaturated aliphatic materials, particularly acrylonitriles (see U.S. 3,282,860 of Edgar L. McDaniel and Howard S. Young, issued Nov. 1, 1966). In that process, however, it was found that the molybdochromiate alone is inactive for the process. Molybdenum oxide catalysts promoted with bismuth oxide, have also been disclosed in U.S. 2,991,320 of George W. Hearne and Kenneth E. Furman, issued July 4, 1971, as effective catalysts for dehydrogenation processes, but, again, with or without an inert support, each component separately is inoperative (see col. 4 of U.S. 2,991,320). Thus, it is quite surprising to find that a hexamolybdochromiate can be made an effective catalyst for the oxydehydrogenation of 2,3-dimethylbutene-1.

In accord with this invention, a process is provided for the oxydehydrogenation of 2,3-dimethylbutene-1 to obtain 2,3-dimethylbutadiene and other products of the oxydehydrogenation by contacting 2,3-dimethylbutene-1 with oxygen at elevated temperatures in the presence of a catalyst obtained by decomposing ammonium hexamolybdochromiate at about 400° to about 700° C.

A particular advantage of the process of this invention is that the amounts of undesirable isopropyl acrolein by-product which is generally formed in the oxydehydrogenation procedure is reduced and yet the process maintains good selectivity and conversion.

As indicated, the catalyst used in the process is derived from ammonium hexamolybdochromiate which is readily prepared by the method described by Hall in the Journal of the American Chemical Society, 29, 692 (1907). The ammonium hexamolybdochromiate is simply heated at about 400° to about 700° C. to convert it to the active catalyst. The catalyst may be supported on the usual particulate catalyst supports such as alumina, silica, clays and other refractory materials, but a support is not essential. However, when an unsupported catalyst is used it is preferred to carry out the oxydehydrogenation in the presence of steam. Catalyst preparation is illustrated as follows:

(A) Supported catalyst 1 gram $(NH_4)_3[CrO_6Mo_6O_{15}] \cdot 10 H_2O$ was dissolved in 10 ml. boiling $H_2O$ and added to 10 g. high alumina catalyst support (Norton AS 101) ground to 20–30 mesh. The water was evaporated off on the steam bath and the solid placed in a muffle furnace at 450° C. overnight.

(B) Unsupported catalyst 8 g. of the ammonium molybdochromiate was treated with 1.1 ml. $H_2O$ and ground slightly with a motar and pestle. The mixture was placed in the oven at 110° C. for 4 hours and then in the muffle furnace at 450° C. overnight. The resulting material was sized to 20–30 mesh.

This unsupported catalyst requires passage of steam through the reactor during the process in order to give conversion and selectivity acceptable for commercial practice.

The reactor system used in the oxydehydrogenation process of the invention may be readily constructed and comprises basically a preheater section, a heated reactor section containing catalyst, an exit section comprising one or more cold traps to remove tars and high boiling fractions, and finally a product collection section where the 2,3-dimethylbutadiene and other products (e.g., dimethylbutene-1 and -2) are removed from the system. As indicated reactor temperature conditions will range from 450° to about 650° C. and the pressure within the system will be essentially atmospheric. Space velocities of the gaseous input through the reactor may vary widely, but the gaseous hydrocarbon space velocity will generally range from about 100 to about 600 and total gaseous hourly space velocity will be from about 1000 to about 5000. Gaseous hydrocarbon space velocity (GHSV) as given herein is the unit volume of gas passing over a unit volume of catalyst per hour. This, GHSV of 2000 means 2000 milliliters of gas flowing over 1 milliliter of catalyst per hour. The ratio of oxygen to hydrocarbon used may also vary widely, but will generally be from 0.5 to 1.5.

When steam is used with an unsupported catalyst the steam space velocity will vary from about 1000 to 3000 and if an inert diluent such as helium or nitrogen is also employed with the steam its space velocity will be on the order of about 400 to 500.

In order to further illustrate and exemplify the invention, the following examples are given:

GENERAL PROCEDURE

The catalyst was sized to 20–30 mesh, and placed in the reactor. Generally the catalyst was mixed with an equal volume of filler of an interlocking crystal structure of corundum and aluminum silicate ("Corhart" 20–30 mesh) as inert diluent. On top of the catalyst bed was placed more filler until the volume within the heated reactor zone was filled.

A mixture of helium and oxygen was passed through the system until reactor and preheater were at temperature and the flow continued for one hour. Oxygen was then turned off and 2,3-dimethylbutene-1 at the selected flow rate turned on. After one minute oxygen was turned back on. This procedure was used to avoid going through the explosive range when introducing hydrocarbon to the system. Before product was collected in the traps, the system was allowed to "line out" for one hour with product gases by-passing the traps. Then the reactor was connected to the traps and the actual run began. Prior to use, the traps were evacuated and filled with helium three times, placed in Dry Ice-butyl Cellosolve, and then evacuated and filled twice more. During the course of the run, two gas samples were taken for mass spectra, the first about half way through the run and the second just before termination of the run. Also, toward the end of the run a 5 ml. gas sample was withdrawn from the exit gas for $CO/CO_2$ analysis by VPC over a temperature programmed 2 foot column of 5A mole sieve. The run was terminated by reversing the start-up procedure. Total volume of exit gases during the run was recorded.

Analysis of liquid product was performed by removing the traps from their Dry Ice baths and placing them in a beaker of Dry Ice such that only the product collection tubes were chilled. This allowed accumulated ice to melt in the traps and run into the tubes. Traps were then removed, product tubes capped and weighed. Volumes of water and hydrocarbon were recorded. The hydrocarbon layer was then analyzed by VPC over a temperature programmed 20-column of diethylene glycol succinate 20% on fine brick.

A variation of procedure from the above was made when steam was introduced to the system when using unsupported catalyst. In this case, steam and helium were passed through the system in addition to the hydrocarbon to be converted.

The data resulting from the runs made appears in the attached table.

EXAMPLE 8

For comparative purposes, mixtures of the oxides of chromium and molybdenum at Cr:Mo mole ratios of 1:6, 1:3, and 1:1 were used as catalyst and found to be unsatisfactory in that poor yields of 2,3-dimethylbutadiene were obtained with high loss of hydrocarbon to carbon oxides.

It is seen from the above examples that 2,3-dimethylbutadiene is readily obtained in good yield and specificity from 2,3-dimethylbutene-1 by the process of the invention and, accordingly, a significant advance in the art has been made.

The invention claimed is:

1. A process for oxydehydrogenation of 2,3-dimethylbutene-1 to 2,3-dimethylbutadiene which comprises contacting 2,3-dimethylbutene-1 at a temperature of from about 450° to 650° C. with a catalyst obtained by thermally decomposing ammonium hexamolybdochromiate at a temperature of from about 400° C. to about 700° C.

2. A process as in claim 1 where the catalyst is supported on a particulate refractory material.

3. A process as in claim 1 where the catalyst is supported on alumina.

4. A process as in claim 1 where the catalyst is unsupported and the process is carried out in the presence of steam.

TABLE

| Example number | Catalyst used [1] | Reactor temp., top of bed/rest of bed | Ratio of $O_2$: hydrocarbon feed | Total gaseous hourly space velocity | Hydrocarbon hourly space velocity | Steam used | Percent conversion | Percent selectivity to 2,3-dimethylbutadiene | Percent to 2,3-dimethylbutadiene | Percent to isopropyl acrolein [2] |
|---|---|---|---|---|---|---|---|---|---|---|
| 1 | A | 550 | 1 | 5,000 | 600 | No | 51 | 70 | 36 | 2.1 |
| 2 | A | 610 | 0.5 | 5,000 | 600 | No | 32 | 70 | 22 | 1.0 |
| 3 | B | 418/450 | 1.07 | 2,474 | 394 | No | 37.8 | 42.2 | 17.2 | 1.1 |
| 4 | B | 556/578 | 1.07 | 2,474 | 394 | No | 42.4 | 54.1 | 19.4 | 1.9 |
| 5 | B | 414/430 | 1.05 | 940 | 159 | No | 39.7 | 46.2 | 15.6 | 1.1 |
| 6 | B | 532/565 | 1.00 | 2,292 | 382 | Yes [3] | 51.2 | 68.4 | 34.9 | 2.3 |
| 7 | B | 539/564 | 1.00 | 3,832 | 382 | Yes [4] | 54.4 | 69.8 | 37.9 | 2.2 |

[1] Refer to catalyst procedure shown above.
[2] Other products include dimethylbutene-1 and dimethylbutene-2.
[3] Steam space velocity 1,100; helium 428.
[4] Steam space velocity 2,640; helium 428.

References Cited

UNITED STATES PATENTS

| | | | |
|---|---|---|---|
| 3,159,688 | 12/1964 | Jennings et al. | 260—680 |
| 3,282,860 | 11/1966 | McDaniel et al. | 252—467 X |
| 3,370,103 | 2/1968 | Callahan et al. | 260—680 |
| 3,437,690 | 4/1969 | Young et al. | 252—467 X |
| 3,488,402 | 1/1970 | Michaels et al. | 260—680 |

PAUL M. COUGHLAN, JR., Primary Examiner

U.S. Cl. X.R.

260—604 R